United States Patent
Pertsel

(10) Patent No.: US 8,259,179 B2
(45) Date of Patent: Sep. 4, 2012

(54) COMPENSATING FOR NON-UNIFORM ILLUMINATION OF OBJECT FIELDS CAPTURED BY A CAMERA

(75) Inventor: Shimon Pertsel, Sunnyvale, CA (US)

(73) Assignee: CSR Technology Inc., Sunnyvale, CA (US)

( * ) Notice: Subject to any disclaimer, the term of this patent is extended or adjusted under 35 U.S.C. 154(b) by 1175 days.

(21) Appl. No.: 11/383,406

(22) Filed: May 15, 2006

(65) Prior Publication Data
US 2007/0262235 A1 Nov. 15, 2007

(51) Int. Cl.
H04N 17/00 (2006.01)
H04N 17/02 (2006.01)
H04N 9/64 (2006.01)
H04N 5/222 (2006.01)

(52) U.S. Cl. .......................... 348/187; 348/251; 348/371

(58) Field of Classification Search .................. 348/175, 348/176, 180, 187, 188, 224.1, 230.1
See application file for complete search history.

(56) References Cited

U.S. PATENT DOCUMENTS

| | | | |
|---|---|---|---|
| 5,815,203 A * | 9/1998 | Lee et al. ..................... | 348/240.3 |
| 6,670,988 B1 | 12/2003 | Gallagher et al. | |
| 6,687,400 B1 | 2/2004 | Szeliski | |
| 6,819,359 B1 * | 11/2004 | Oda .............................. | 348/247 |
| 7,570,881 B2 * | 8/2009 | Perala et al. .................. | 396/182 |
| 2002/0140836 A1 * | 10/2002 | Miyake et al. ................ | 348/340 |
| 2002/0145769 A1 * | 10/2002 | Pollard ......................... | 358/504 |
| 2003/0044066 A1 * | 3/2003 | Sakaguchi .................... | 382/168 |
| 2003/0052991 A1 | 3/2003 | Stavely et al. | |
| 2004/0032952 A1 | 2/2004 | Pinto et al. | |
| 2004/0239782 A1 * | 12/2004 | Equitz et al. ................. | 348/246 |
| 2004/0257454 A1 | 12/2004 | Pinto et al. | |
| 2005/0041806 A1 * | 2/2005 | Pinto et al. ................... | 380/210 |
| 2006/0109358 A1 * | 5/2006 | Song et al. ................... | 348/275 |
| 2008/0043117 A1 * | 2/2008 | Kim et al. .................... | 348/224.1 |

FOREIGN PATENT DOCUMENTS

| | | |
|---|---|---|
| EP | 1 292 128 A2 | 3/2003 |
| JP | 2003-304443 A | 10/2003 |

OTHER PUBLICATIONS

Petschnigg et al., "Digital Photography with Flash and No-Flash Image Pairs," Microsoft Corporation, Aug. 2004, 9 pages.
EPO/ISA, "Notification of Transmittal of the International Search Report and the Written Opinion of the International Searching Authority, or the Declaration," corresponding International Patent Application No. PCT/US2007/067215, mailed on Sep. 12, 2007, 14 pages.

* cited by examiner

*Primary Examiner* — Albert Cutler
(74) *Attorney, Agent, or Firm* — Perkins Coie LLP

(57) ABSTRACT

Techniques for modifying data of an image that can be implemented in a digital camera, video image capturing device and other optical systems are provided to correct for non-uniform illumination appearing in data obtained using one or more illumination sources from a two-dimensional photo-sensor. In order to correct for these variations, a small amount of modification data is stored in a small memory within the optical system. According to a specific embodiment, non-uniform illumination correction factors are derived during a calibration procedure by illuminating a surface having uniform optical properties with the non-uniform illumination source and imaging that illuminated surface onto the photo-sensor.

55 Claims, 5 Drawing Sheets

COMPENSATING FOR NON-UNIFORM ILLUMINATION OF OBJECT FIELDS CAPTURED BY A CAMERA

CROSS-REFERENCE TO RELATED APPLICATION

This is related to another application of Shimon Pertsel entitled "Techniques for Modifying Image Field Data Obtained Using Illumination Sources," U.S. patent application Ser. No. 11/383,417 being filed May 15, 2006.

FIELD OF THE INVENTION

This invention relates generally to techniques of processing captured digital imaging data obtained using one or more illumination sources, and, more specifically, to processing binary digital image data obtained using one or more illumination sources to correct for variations across an imaged optical field such as, for example, to compensate for non-uniform illumination.

BACKGROUND

Digital cameras image scenes onto a two-dimensional sensor such as a charge-coupled-device (CCD), a complementary metal-on-silicon (CMOS) device or other type of light sensor. These devices include a large number of photo-detectors (typically three, four, five or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to typically generate a serial stream of data of the intensity of radiation striking one sensor element after another as they are scanned. Color data are most commonly obtained by using photo-detectors that are sensitive to each of distinct color components (such as red, green and blue), alternately distributed across the sensor. Non-uniform illumination, and potentially other factors, causes an uneven distribution of light across the photo-sensor, and thus image data signals from the sensor include data of the undesired intensity variation superimposed thereon.

SUMMARY OF THE INVENTION

One or more illumination sources may be used to illuminate an image field. An illumination source may, as an example, be a flash illumination device. An illumination source will often be part of the imaging device but may also be a separate device. An illumination source may produce non-uniform illumination across an image field. Non-uniform illumination may be attributed to imperfections in or other characteristics of an illumination source, improper alignment of an illumination source in relation to the x-y position of the image plane of the photo-sensor employed, and possibly other factors that may be present in a particular system.

The invention offers techniques for modifying image field data to compensate for non-uniformities in the illumination so as to minimize degradation of the final adjusted image by these non-uniformities in one or more illumination sources. The amount of compensation applied to the signal from each photo-detector element is dependent upon the position of the element in relationship to the pattern of non-uniform illumination of the image field across the surface of the image photo-sensor.

Such non-uniform illumination compensation techniques have application to digital cameras and other types of digital image capturing devices employing one or more illumination sources but are not limited to such optical photo system applications. The techniques may be implemented at a low cost, require a minimum amount of memory, and operate at the same rate as the digital image data being modified is obtained from the photo-sensor, thereby not adversely affecting the performance of the digital image processing path. This is accomplished by applying correction factors in real time to the output signals of the photo-sensor in order to compensate for an undesired intensity variation across the photo-sensor.

In a specific embodiment, the camera or other optical system is calibrated by imaging a scene of uniform intensity onto the photo-sensor, capturing data of a resulting intensity variation across the photo-sensor. The pixel array is logically divided into a grid of blocks and then average rates of change of the intensity across each block are computed. The calibration data needed to correct for the intensity variation is computed as the inverse of the intensity variation. A reduced amount of data of the undesired non-uniform illumination pattern (or the inverse, the non-uniform illumination correction factors) may be stored in one or more sparse two-dimensional lookup tables. A separate lookup table can be used for each color.

Additional objects, advantages and features of the present invention are included in the following description of exemplary embodiments thereof, which description should be taken in conjunction with the accompanying drawings. Each patent, patent application, article or publication referenced herein is hereby incorporated herein in its entirely for all purposes by such reference.

DESCRIPTION OF EXEMPLARY EMBODIMENTS

Figure 1:
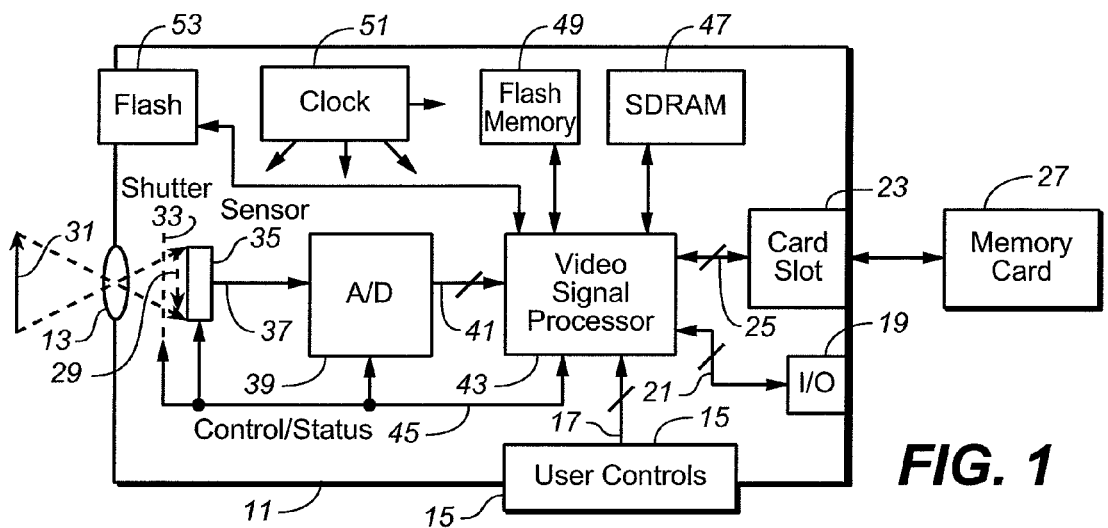
FIG. 1 schematically illustrates an digital camera in which the techniques of the present invention may be utilized.

When one or more illumination sources are used to illuminate an image field, non-uniform illumination across the image field may result in a variation of energy across each pixel of that light pattern. These energy variations are not related to the captured image or other picture data itself. The variation of illumination across the scene, assuming the objects in the scene are approximately the same distance from the source of the flash illumination, has fixed properties. These properties are directly related to the physical, optical and electronic characteristics of the illuminating flash source. In order to compensate for this variation in energy across the photo-sensor, each pixel value could be combined, such as by multiplication, with a non-uniform illumination correction factor. This factor is unique to each pixel in the image sensor according to the pixel's geographic location in the image sensor matrix. In the ideal case, a table of factors could be created during a calibration procedure that stores the required compensation factor for each pixel of the image in memory. This would allow the needed non-uniform illumination compensation to be effected by executing one of the following equations with a processing unit in the image capturing device:

$$PixelOut=PixelIn+F(X,Y) \quad (1a)$$

or $$PixelOut=PixelIn*F'(X,Y) \quad (1b)$$

where,
PixelOut=The intensity output of the non-uniform illumination compensation module; in other words, the corrected pixel;
PixelIn=The intensity input to the non-uniform illumination compensation module; in other words, the pixel before correction;
F(X,Y)=An additive correction factor, having units of intensity, which depends on the pixel's position expressed in terms of X and Y rectangular coordinates; and
F'(X,Y)=A dimensionless multiplicative correction factor, which also depends on the pixel's position expressed in terms of X and Y rectangular coordinates.

To calculate the correction factors for the entire image, one of the following equations is executed:

$$CT[x,y]=T[x,y]+IC[x,y], \quad (2a)$$

or $$CT[x,y]=T[x,y]*IC'[x,y], \quad (2b)$$

where CT[x,y] is the illumination-corrected image data set of interest as a function of the position (x,y) of an image data point of interest, T[x,y] is the un-corrected image data set of interest as a function of the position (x,y) of an image data point of interest, and IC[x,y] is an additive illumination correction factor of equation (2a) as a function of the position (x,y) of a image data point of interest. IC'[x,y] is a dimensionless multiplicative illumination correction factor as a function of the position (x,y) of a image data point of interest, in the alternative equation (2b). Generally speaking, equations (2a) and (2b) represent the image-wide equivalent of equations (1a) and (1b), respectively, which are applied on a pixel by pixel (or pixel block by pixel block) basis. When all of the corrective factors IC[x,y] or IC'[x,y] for a particular image, depending upon which of equations (2a) or (2b) is being used, are listed according to their x,y coordinates, this list represents a two-dimensional mask. The values of that mask at positions x,y across the image are then combined with the image data at the same positions x,y across the image.

It would be very costly to implement the process defined by this equation on an integrated circuit with the storage of correction factors for each pixel of the photo-sensor. A large memory would be required to store a correction factor for each pixel and thus utilize a large area of silicon for the memory. Multiplication of the pixel values by the individual stored correction factors can further require a significant amount of silicon area for dedicated circuits to carry out the multiplication and/or can slow down the speed with which corrected data are obtained. Therefore, the techniques described herein provide alternative methods that require very little memory and processing power but yet eliminate undesired light patterns from the image that are caused by artificially illuminating the image scene.

Optical Device Example

An implementation of the techniques of the present invention is described in a digital camera or other digital image acquisition device, where digital data of the image(s) or other captured light pattern(s) obtained using one or more illumination sources are modified on the fly to compensate for intensity variations superimposed across the image due to non-uniform illumination. In FIG. 1, such a digital camera is schematically shown to include a case 11, an imaging optical system 13, user controls 15 that generate control signals 17, a video input-output receptacle 19 with internal electrical connections 21, and a card slot 23, with internal electrical connections 25, into which a non-volatile memory card 27 is removably inserted. Data of images captured by the camera may be stored on the memory card 27 or on an internal non-volatile memory (not shown). Image data may also be outputted to a video device, such as a television monitor, through the receptacle 19. The memory card 27 can be a commercially available semiconductor flash electrically erasable and programmable read-only-memory (EEPROM), small removable rotating magnetic disk or other non-volatile memory to which digital image data can be stored by the camera. Alternatively, particularly when the camera is taking motion image sequences at thirty image frames per second or the like, larger capacity storage media can be used instead, such as magnetic tape or a writable optical disk.

The optical system 13 can be a single lens, as shown, but will normally be a set of lenses. An image 29 of a scene 31 is formed as visible optical radiation through a shutter 33 onto a two-dimensional surface of an image sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of digital image data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

Processing of the video data in circuits 41 and control of the camera operation are provided, in this embodiment, by a single integrated circuit chip 43. In addition to being connected with the circuits 17, 21, 25 and 41, the circuit chip 43 is connected to control and status lines 45. The lines 45 are, in turn, connected with the shutter 33, sensor 29, analog-todigital converter 39 and other components of the camera to provide synchronous operation of them. A separate volatile random-access memory circuit chip 47 is also connected to the processor chip 43 for temporary data storage. Also, a separate non-volatile re-programmable memory chip 49 is connected to the processor chip 43 for storage of the processor program, calibration data and the like. A usual clock circuit 51 is provided within the camera for providing clock signals to the circuit chips and other components. Rather than a separate component, the clock circuit for the system may alternatively be included on the processor chip 43. An illumination source 53 is connected to, and operates in response to instructions from, the processor chip 43.

Sensor 35 may have its large number of pixels logically divided into rectangles of a grid pattern. One way to determine the correction factor for individual pixels, without having to store such factors for all pixels of the array, is to store them for a representative few of the pixels in each block and then calculate the correction for other individual pixels by interpolation, linear or otherwise. That is, the size of the blocks of the grid pattern are made small enough such that the intensity variation of the non-uniform illumination pattern across an individual block may be predicted from a few stored values in the block. For each pixel location, the correction factor is extrapolated from this stored subset. The correction factor extrapolation formula is implemented as a two dimensional extrapolation responsive to the geometric distance between the pixel of interest at a current location, and neighboring pixels that are represented by a non-uniform illumination correction factor stored in a limited table of correction factors.

Figure 2:
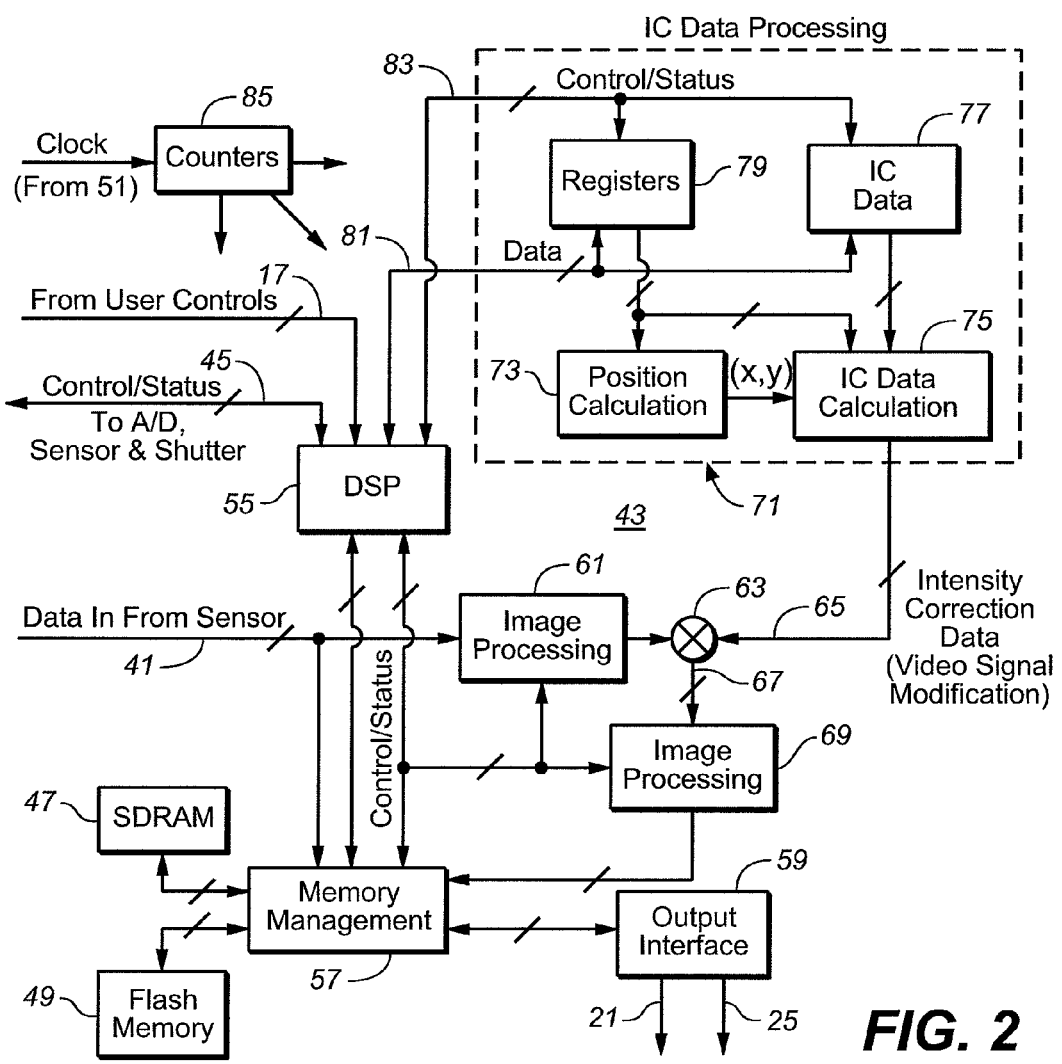
FIG. 2 is a block diagram of a portion of the electronic processing system of the device of FIG. 1.

A functional block diagram of the processor chip 43 is shown in FIG. 2. A digital signal processor (DSP) 55 is a key component, controlling both the operation of the chip 43 and other components of the camera. But since the DSP 55 does not extensively process video data, as discussed below, it may be a relatively simple and inexpensive processor. A memory management unit 57 interfaces the DSP 55 to the external memory chips 47 and 49, and to output interface circuits 59 that are connected to the input-output connector 19 and to the card slot 23 (FIG. 1) through respective circuits 21 and 25.

The flow of digital image data through the block diagram of FIG. 2 from the analog-to-digital converter 39 (FIG. 1) is now generally described. The input data in lines 41 is pre-processed in a block 61 and then provided as one input to a multiplier circuit 63. Another input 65 to the multiplier 63 carries data that modifies the incoming video data, the modified video data appearing at an output 67 of the multiplier 63. In this example, the intensity correction data in lines 65 correct for the effects of lens shading and intensity variations imparted across the image by camera elements. After further image processing 69, as appropriate, the digital image data are directed through the memory management unit 57 to the output interface circuits 59 and then through either lines 21 to the input-output receptacle 19 or through lines 25 to the memory card slot 23 (FIG. 1), or both, of the camera for display and/or storage.

The intensity correction data in lines 65 are generated by a block of dedicated processing circuits 71. The block 71 includes circuits 73 that provide the (X, Y) position of each image pixel from which video data are currently being acquired. This pixel position is then used by an intensity correction data calculation circuit 75 to generate the modification factor applied to the multiplier 63. A memory 77 stores a look-up table. In order to reduce the size of the memory 77, only a small amount of correction data are stored in the look-up table and the circuits 75 calculate the correction values of individual pixels from such data.

A set of registers 79 stores parameters and intermediate results that are used by both of the calculation circuits 73 and 75. The calculation circuits 73 and 75 operate independently of the DSP 55. The DSP could possibly be used to make these calculations instead but this would require an extremely fast processor, if sufficient speed were even available, would be expensive and would take considerable more space on the chip 43. The circuits 73 and 75, dedicated to performing the required repetitive calculations without participation by the DSP 55, are quite straightforward in structure, take little space on the chip 43 and frees up the DSP 55 to perform other functions. The memory or memories 77 and 79 storing the image modification data and parameters are preferably a volatile random-access type for access speed and process compatibility with other processor circuits so that they can all be included on a single cost effective chip.

A typical digital imaging system processes data for each of multiple distinct color components of the image. A typical commercial sensor alternates photo-detectors along the rows that are covered with red, green and blue filters. There are several different arrangements of the color sensitive photo-detectors that are commercially used. In one such arrangement, one row contains alternating red and green sensitive photo-detectors, while the next row contains alternating blue and green sensitive photo-detectors, the photo-detectors also being positioned along the rows to provide alternating color sensitivity in columns. Other standard arrangements use other combinations of the alternating colors.

If there is only one set of correction data for all of the discrete colors being detected, an image modification factor is generated for each image pixel from that set of data, regardless of the color. This is quite adequate in cases where the variation across the image that is being removed by the signal modification affects all colors to the same or nearly the same degree. However, where the variation is significantly color dependent, separate correction factors are preferably used for each color component.

One desirable flash strobe module is an insulated gate bipolar transistor (IGBT) type, allowing for the intensity of the illumination level to be controlled. A flash strobe module employing a silicon-controlled rectifier (SCR) does not permit effective control of flash intensity.

Specific Embodiment

In this embodiment, non-uniform illumination correction factors for an optical photo system of a digital camera, digital video capturing device or other type of digital imaging device, are derived during a calibration procedure. This calibration is performed by imaging a surface having uniform optical properties onto the photo-sensor employed by the device being calibrated. One example of such a surface is a uniform mid-level gray target. The individual pixel intensity values of an image of such a target are captured and the slope values for the individual rectangles of the grid across the photo-sensor are calculated and stored in a memory within the device being calibrated. Image modification data and parameters are generated once for each camera at a final stage of its manufacture and then are permanently stored in the non-volatile memory 49 (FIG. 2). These data are then loaded through lines 81 into the memories 77 and 79 each time the system is initialized, under control of the DSP 55 operating through control and status lines 83.

Figure 3:
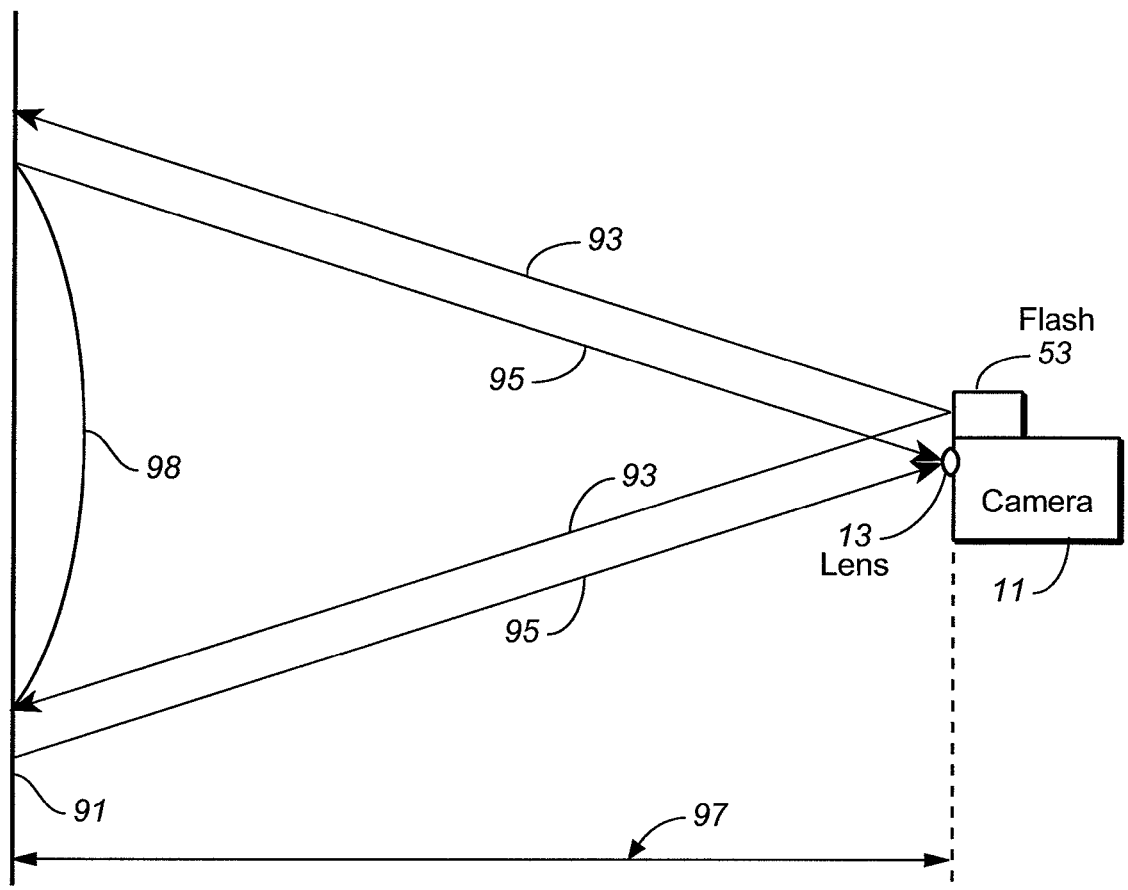
FIG. 3 schematically illustrates the calibration phase of a specific embodiment of the invention, employing a surface with uniform optical properties, a camera with an artificial illumination source, and showing the path of incident light emitted by the illumination source and reflected light reflected from the surface back to the camera lens.

FIG. 3 schematically illustrates the calibration phase of the operation of the invention according to the this embodiment.

An imaging device (e.g., a camera) employing an illumination source (e.g., a flash) is calibrated by use of an illumination balance reference, which is a uniformly reflecting target image (such as a gray card), in order to correct for non-uniform illumination by the illumination source. A camera (or other imaging device) 11 comprising a lens 13 and an illumination source 53 in the form of a flash is used to capture an image of surface 91 with uniform color, absorption/reflection, dispersion and other optical properties thereacross. Light rays 93 are generated by the flash 53 and emanate toward the surface 91. Incident light rays 93 strike the surface 91, which reflects rays 95. The reflected rays 95 are imaged by a lens 13 onto the photo-detector within the camera 11. The camera 11 then processes the information and uses it to calibrate the non-uniform illumination correction data that will compensate for non-uniform illumination across an image scene that is produced by the flash 53. It should be noted that the focal length 97 in this embodiment is the indicated as a perpendicular distance from the lens 13 to the surface 91.

Figure 4:
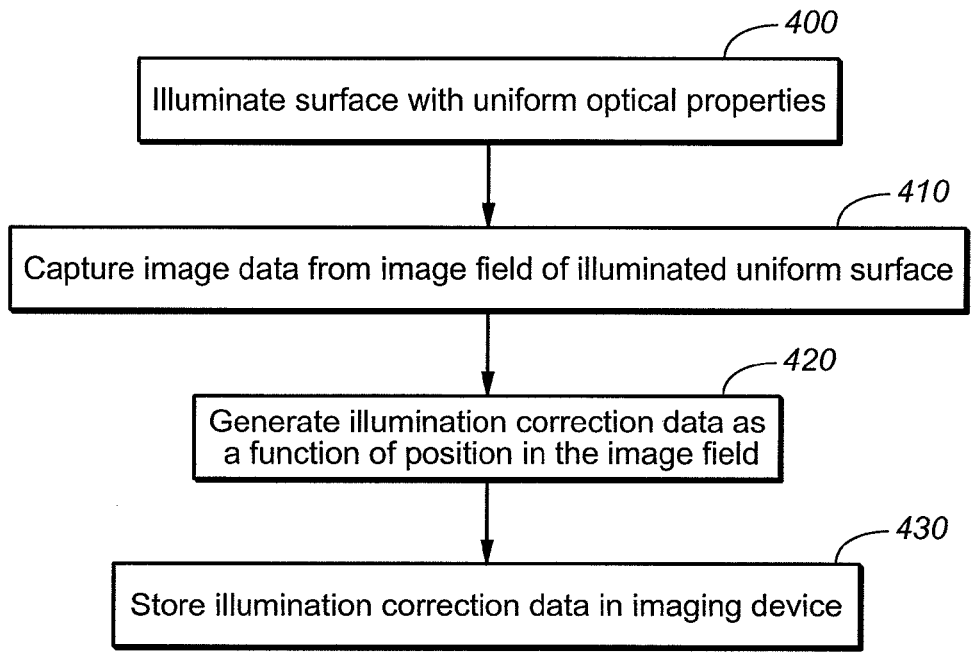
FIG. 4 is a block diagram setting forth steps in calibration of a camera or other optical system of interest using an illuminated surface with uniform optical properties.

FIG. 4 is a block diagram setting forth steps of factory calibration. In step 400, a surface with uniform optical properties is illuminated. In step 410, image data from the image field of the illuminated uniform surface is captured. In step 420, illumination correction data are generated as a function of position in the image field. In step 430, the illumination correction data are stored in a non-volatile memory of the imaging device.

In two prior patent applications, Publication Number 2004-0032952 A1, filed Aug. 16, 2002, and Publication Number 2004-0257454, filed Dec. 30, 2003, intensity variations across the image are compensated by characterizing those variations as one or more geometric shapes, such as circles, ellipses or hyperbolas, and then storing a resulting small amount of data necessary to characterize the geometric shape or shapes. The correction factor for each pixel may be computed as a one-dimensional function along the geometric distance to a reference on the image geometric plane. In order to greatly simplify the circuits that perform the calculations, the algorithm executed by the circuits 73 (FIG. 2) preferably relies upon arithmetic addition, which is a fast and simple way of computing a correction factor for each pixel based on its position.

However, there are situations where it is too difficult or not practical to represent a non-uniform illumination pattern with desired accuracy by one or a few simple geometric shapes. As an alternative, according to a third application, Publication Number 2005-0041806 A1, filed Feb. 2, 2004, the matrix of pixels of a photo-sensor can be logically divided into a grid of a large number of contiguous rectangular blocks that each contains a fixed number of pixels on a side. During calibration, data of the non-uniform illumination pattern on the individual blocks are calculated and stored, from which a stored data correction factor is calculated for the individual pixels or blocks of pixels as picture data are scanned from the photo-sensor, in real time, typically in a raster scanning pattern.

The calibration data may in some applications be captured and stored with a resolution that is less than that with which data of an image field are normally captured. When capturing data of the uniform screen 91 (FIG. 3), for example, data of individual pixels may be combined to provide one data point per color component for a block of pixels. This reduces the amount of calibration data that need to be stored in the camera and increases the speed with which correction of full resolution image data may be made.

Figure 5:
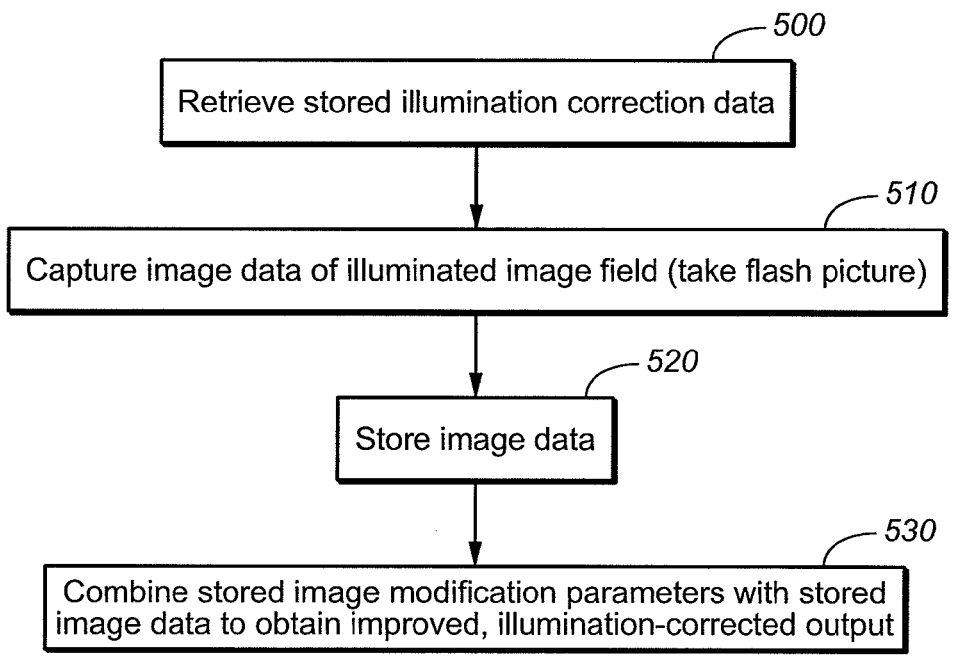
FIG. 5 is a block diagram setting forth steps in applying stored illumination calibration data to obtain illumination-corrected output.

FIG. 5 is a block diagram setting forth steps in applying stored illumination correction calibration data to obtain illumination-corrected output. In step 500, stored illumination correction data is retrieved. In step 510, image data of the illuminated image field is captured. In step 520, the captured image data is stored. In step 530, the image modification parameters are combined with the image data to obtain improved, illumination-corrected output.

Figure 6A:
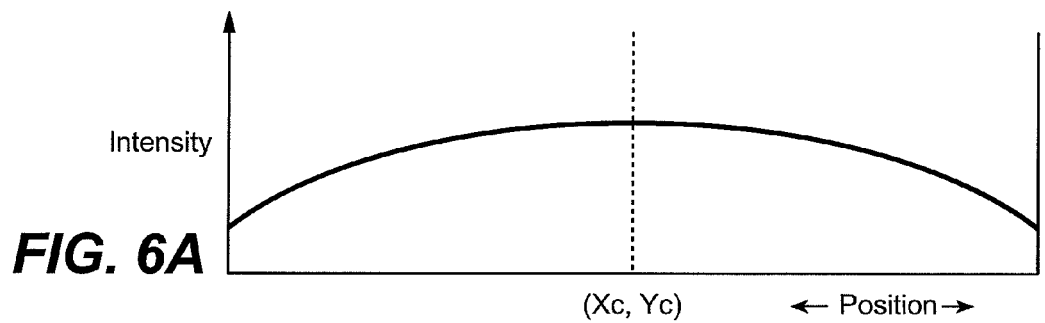
FIGS. 6A, 6B, 6C, 6D, 6E graphically illustrate the application of stored illumination calibration data to obtain illumination-corrected output.
Figure 6B:
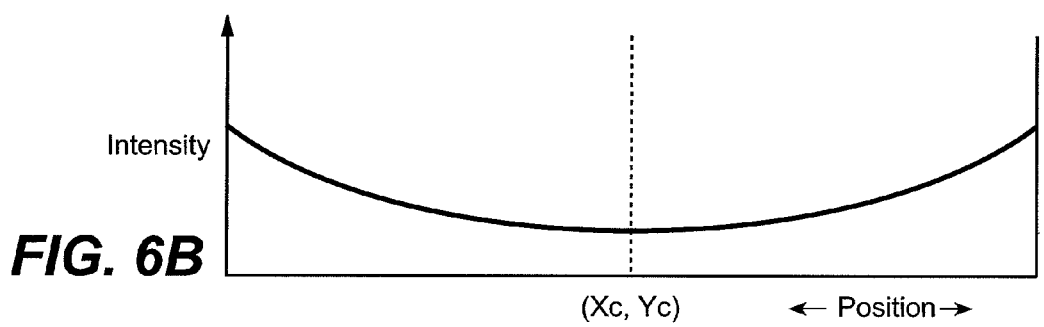
Figure 6C:
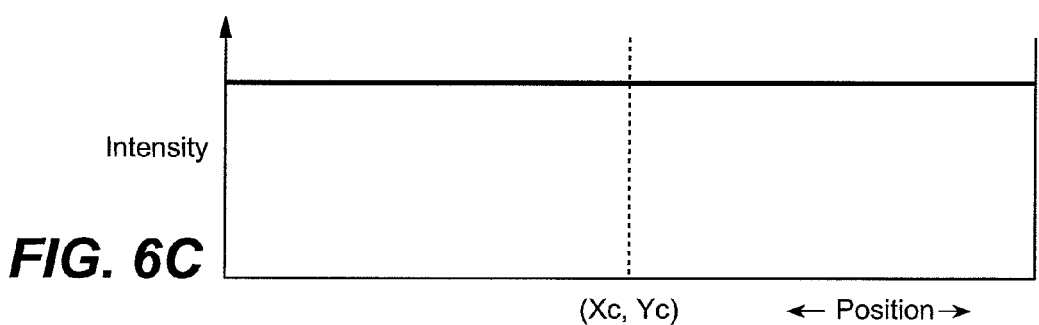
Figure 6D:
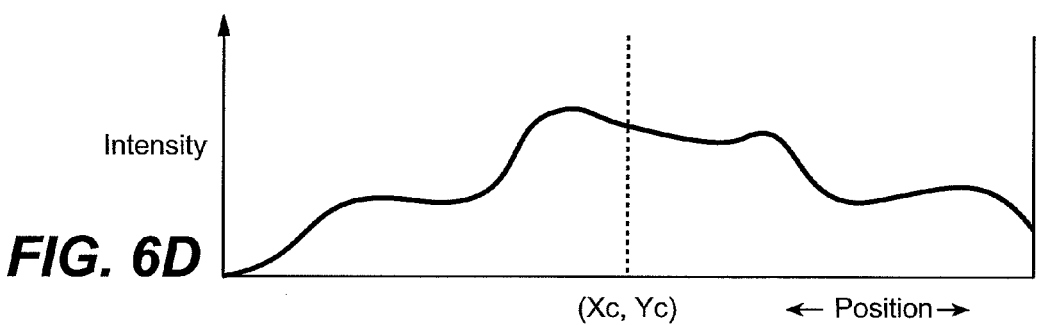
Figure 6E:
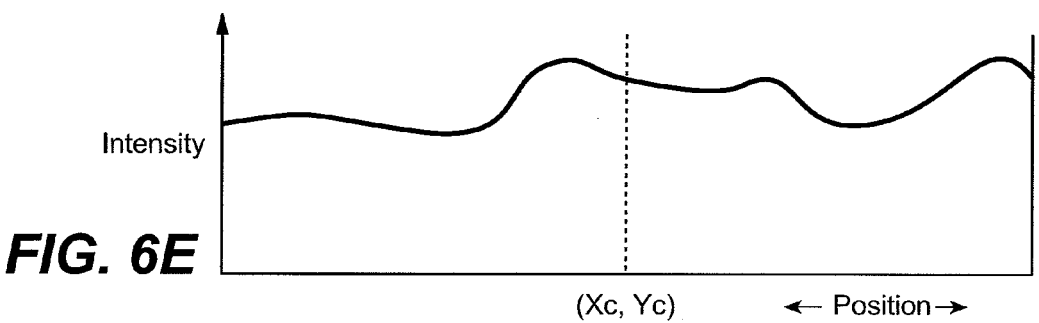

FIGS. 6A-6E graphically illustrate the application of stored illumination correction calibration data to obtain illumination-corrected output. Each figure provides a plot of intensity against position (in either the x or y direction) along a line across a photo-sensor through its optical center. FIG. 6A depicts the intensity relative to position of light reflected by a surface with uniform optical properties. FIG. 6B depicts illumination correction data 98, which is designed to compensate for the non-uniformities seen in FIG. 6A. The arithmetic sum of intensity on the photo-sensor and the illumination correction data produces a flat line of constant intensity, as seen in FIG. 6C. In FIG. 6D, an example is provided of possible data for an image of interest. FIG. 6E provides the illumination-corrected data for this same intensity pattern.

Figure 7:
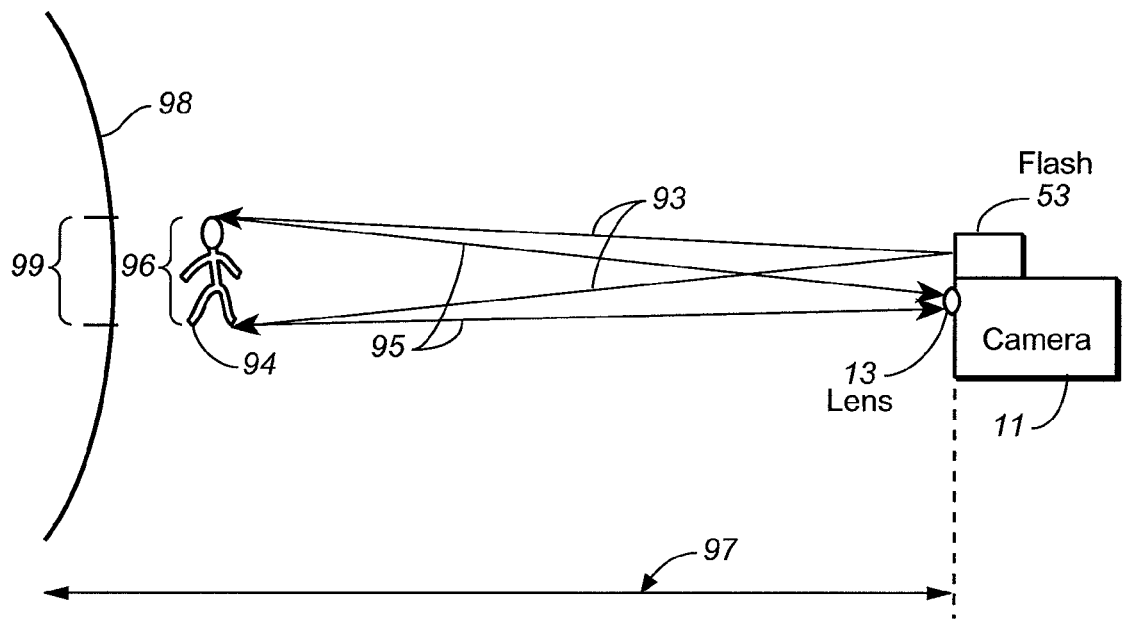
FIG. 7 schematically illustrates an image capture and modification phase in which an object of interest is imaged, employing the camera with an artificial illumination source, and showing the path of incident light emitted by the illumination source and reflected light reflected from the object of interest back to the camera lens.

FIG. 7 schematically illustrates an example of the capture of the image of interest of step 510. The camera 11, with its lens 13 and illumination source 53, is used to capture data of an object scene of interest 94. The object of interest 94 has a length 96 and typically subtends a segment 99 of the calibration non-uniform illumination correction data 98. Incident light rays 93 are generated by the flash 53 and emanate toward the object 94. Incident light rays 93 strike the object 94, which reflects reflected rays 95. Reflected rays 95 are imaged by the lens 13 onto the photo-detector. The camera 11 then combines the image of interest with the calibration data 98 (step 530) to produce an illumination-corrected image of the object of interest 94. Focal length 97 is the indicated distance from lens 13 to object 94. In this example, only segment 99 of the calibration data 98 is used to produce the corrected image. Calibration data 98 not contained within segment 99 have no effect on the corrected image generated of object of interest 94. A higher zoom setting will result in a smaller portion of the image of interest being captured by the imaging device. The angle subtended by the captured image of interest, i.e., the zoom setting used, is incorporated into the calibration process. The calibration process also incorporates the distance of the imaging device from the image of interest, which bears an inverse square relationship to the intensity. It is assumed that the non-uniform illumination pattern is independent of distance from the imaging device, while varying in intensity. Either the correction process is performed pixel by pixel or else it is performed pixel block by pixel block.

Figure 8:
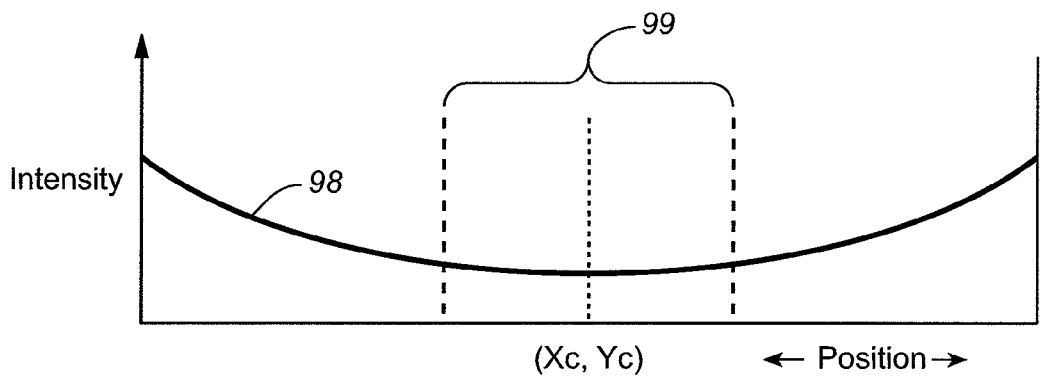
FIG. 8 graphically illustrates the selection of a relevant portion of the calibration information.

FIG. 8 represents the calibration curve of FIG. 6B, with segment 99 indicated as the portion of the calibration curve lying between the dashed lines. Only segment 99 of the calibration data is used in correcting the image of interest.

Calibration correction information can be executed within the imaging device, thus permanently modifying the original, uncorrected image data. Alternatively, the calibration correction information can be stored within the imaging device as auxiliary data to be used in post-processing at a digital image processing service center, or by the user as part of image enhancement. The corrected image may be previewed on the imaging device's preview screen before it is permanently applied to the image data. The calibration can be carried out using low resolution images. Low resolution images will typically suffice for obtaining calibration correction information for a featureless object.

According to the specific embodiment being described herein, each camera or other optical system is calibrated by imaging a scene of uniform intensity onto the photo-sensor, capturing data of each pixel of a resulting intensity variation across the photo-sensor, logically dividing the pixel array into a grid of blocks and then calculating average rates of change of the intensity across each block. These relatively few intensity slope values, the characteristics of the pixel grid and the absolute intensity of the first pixel of each scanned frame, characterize the non-uniform illumination intensity variation across the photo-sensor with a reduced amount of data. It is usually desirable to acquire three sets of such data, one set for each primary color that is utilized in the picture processing.

The created slope tables and the basic gain is stored in a digital camera's nonvolatile memory 49 of FIGS. 1 and 2, for example, during the manufacturing process, and subsequently used to compensate for non-uniform illumination non-uniformities as previously described.

In cases in which more than one illumination source is in use, correction for non-uniform illumination can be achieved by using the principle of superposition. The composite non-uniform illumination pattern to be corrected is composed of several non-uniform illumination patterns superimposed on one another. These patterns are preferably separated at calibration time and multiple non-uniform illumination patterns are visualized, each with its own center of gravity. (The center of gravity is also known as the optical center or the anchor point.) These centers of gravity can then be combined into an "effective center of gravity" and used to form lookup table 77 of FIG. 2, or each used individually to derive separate look up tables which are subsequently combined to form lookup table 77. In this latter case, the algorithm employed to combine these shading correction factors for use in table 77 can be either linear, piece-wise linear, or non-linear. Thus, a large degree of flexibility in choosing non-uniform illumination correction factors with respect to a particular image element location is provided.

The optical center of a pattern of illumination will not necessarily be aligned with or bear any particular relationship with the optical geometry of the imaging device. The pattern of illumination may, for instance, be incident from one side of the image of interest. Reflector devices can be employed to attempt to assist but typically cannot precisely resolve such considerations. Illumination correction patterns are a means for correcting for such issues. Effects of a varying focal length may also be taken into account.

Since the complete optical photo system of the digital imaging device is employed during the calibration procedure, the correction data also include correction for any intensity variations across the image that are caused by lens shading, effects of the optical cavity, the image sensor and/or its interaction with the incident image light, and the like, in addition to providing correction for non-uniformities due to non-uniform illumination by the illumination source. It may be desirable to have separate correction data for the non-uniform illumination of an object scene. If so, correction data are separately captured for lens shading and the like by imaging the same screen used in acquiring illumination correction data with a non-uniform light source but this time with uniform illumination across it, such as by one of the methods described in the previously identified U.S. patent application publication numbers 2004-0032952, 2004-0257454 and 2005-0041806. When the resulting lens shading data are subtracted from the combined correction data obtained with the non-uniform light source according to this embodiment, on a pixel-by-pixel or pixel-block by pixel-block basis, correction data for the non-uniform light source are obtained without components of lens shading and the like.

CONCLUSION

The present invention provides unique illumination compensation of digital images captured from a non-uniformly lit scene. A common instance where such compensation is beneficial is the capture of a scene illuminated by a digital camera's small, built-in, electronic flash unit.

Although the present invention has been described with respect to certain embodiments, it will be understood that the invention is entitled to protection within the fall scope of the appended claims.

It is claimed:

1. A method of calibrating an imaging device that uses an illumination source, comprising:
   illuminating with the illumination source a surface having uniform optical properties thereacross;
   capturing image data from an image field of the uniform surface as illuminated by the illumination source;
   generating, from the captured image data, illumination correction data to compensate for illumination variations attributable to the illumination source as a function of position in the image field;
   storing the illumination correction data in the imaging device;
   capturing image data of an object image field illuminated by the illumination source, the object image field including an object of interest;
   retrieving only a portion of the stored illumination correction data that maps directly to a portion of the object image field subtended by the object of interest in an image plane of the imaging device; and
   combining only the retrieved portion of the illumination correction data with the captured image data of the object image field, to obtain an illumination-corrected object image data set, thereby correcting for variations in the intensity attributable to the illumination source.

2. The method of claim 1, wherein generating the illumination correction data includes maintaining a plurality of sets of illumination correction data for the individual pixels being scanned, one set of data for each of a plurality of color components of the optical field.

3. The method of claim 1, wherein generating the illumination correction data is done as a function of distance from an optical center.

4. The method of claim 3, wherein the illumination correction data are generated as a function of distance from an optical center of an optical system utilized to capture the image data.

5. The method of claim 3, wherein the illumination correction data are generated as a function of distance from an optical center of the illumination source.

6. The method of claim 1, wherein the capturing, generating, and storing functions are all accomplished on a single integrated circuit chip.

7. The method of claim 1, wherein the capturing, generating, and storing functions are all performed by electronic circuits dedicated to carrying out these functions.

8. The method of claim 1, wherein the illumination source is included within the imaging device.

9. The method of claim 1, wherein the illumination source includes a flash.

10. The method of claim 9, wherein the flash is included within the imaging device.

11. The method of claim 1, wherein the illumination correction data are stored in a nonvolatile memory device.

12. The method of claim 11, wherein the nonvolatile memory device includes a flash memory device.

13. The method of claim 1, wherein the imaging device is a still camera.

14. The method of claim 1, wherein the imaging device is a video camera.

15. The method of claim 1, wherein the imaging device is a personal digital assistant (PDA).

16. The method of claim 1, wherein the imaging device is a cellular telephone.

17. The method of claim 1, wherein the imaging device is handheld.

18. A method of modifying electronically captured image field data using an imaging device that has been calibrated according to the method of claim 1,
wherein the resolution of the object image data set is greater than the resolution of the illumination correction data.

19. The method of claim 1, wherein the imaging device has an array of pixels corresponding to the image field, and wherein the illumination correction data does not include a separate correction value for each pixel in the array of pixels.

20. The method of claim 19, wherein generating the illumination correction data comprises:
capturing, for each of the pixels in the pixel array, data of an intensity variation across a photo-sensor resulting from said illuminating the surface having uniform optical properties thereacross;
dividing the pixel array into a grid of blocks; and
calculating average rates of change in intensity across each block in the grid of blocks; and
wherein storing the illumination correction data in the imaging device comprises storing, in the imaging device, data representing slope values indicative of said average rates of change in intensity.

21. The method of claim 1, further comprising:
selecting said portion of the stored illumination correction data to be retrieved and used for said combining, on the basis of at least a distance of the imaging device from the image field and a zoom setting of the imaging device.

22. A method of modifying an image field being electronically captured, comprising:
retrieving, from a storage device, illumination correction data configured to compensate for variations in intensity across an image field being electronically captured that are attributable to a source of illumination across the image field, the retrieved illumination correction data including only illumination correction data that maps directly to a portion of the image field subtended by an object of interest in an image plane of an imaging device;
illuminating the image field with the illumination source;
capturing image data of the image field as illuminated by the illumination source; and
combining only the retrieved illumination correction data with the image data to obtain an illumination-corrected image data set, thereby correcting for variations in intensity across the image field that are attributable to the illumination source.

23. The method of claim 22, wherein combining the retrieved illumination correction data includes selecting the illumination correction data to be retrieved from the storage device on the basis of at least a distance from the image field that data thereof are captured.

24. The method of claim 22, wherein capturing image data of the illuminated image field includes using a digital camera to capture the image data, in which the illumination correction data are stored, and wherein combining the retrieved illumination correction data includes selecting the illumination correction data to be retrieved from the storage device on the basis of at least a distance of the digital camera from the image field and a zoom setting of the digital camera.

25. The method of claim 22, wherein capturing image data of the illuminated image field includes using a digital camera, the illumination correction data are stored in the digital camera and combining the retrieved illumination correction data with the captured image data is performed within the digital camera.

26. The method of claim 22, wherein capturing image data includes directing the illuminated image field onto a two-dimensional photodetector array of pixels, and wherein retrieving the illumination correction data includes referencing a table of image modification values as a function of radial position of individual pixels from an optical reference point and calculating radial distances of individual pixels within the two-dimensional photodetector array by adding a value to the radial distance calculated for the immediately preceding scanned pixel.

27. The method of claim 22, wherein combining the retrieved illumination correction data with image data includes making a calculation according to the following equation:

$$CT[x,y]=T[x,y]+IC[x,y],$$

wherein $T[x,y]$ is the captured image data of the illuminated image field as a function of position (x,y) across the image field, $IC[x,y]$ is the retrieved illumination correction data as a function of position (x,y) across the image field, and $CT[x,y]$ is the illumination-corrected image data set as a function of position (x,y) across the image field.

28. The method of claim 22, wherein combining the retrieved illumination correction data with image data includes making a calculation according to the following equation:

$$CT[x,y]=T[x,y]*IC'[x,y],$$

wherein $T[x,y]$ is the captured image data of the illuminated image field as a function of position (x,y) across the image field, $IC'[x,y]$ is the retrieved illumination correction data as a function of position (x,y) across the image field, and $CT[x,y]$ is the illumination-corrected image data set as a function of position (x,y) across the image field.

29. The method of claim 22, wherein the retrieving, capturing and combining are performed within an image acquisition device.

30. The method of claim 29, wherein the source of illumination across the image field is included as part of the image acquisition device.

31. The method of claim 30, wherein the source of illumination includes a flash light.

32. The method of claim 29, wherein the illumination correction data are stored in a nonvolatile memory within the image acquisition device.

33. The method of claim 29, wherein the image acquisition device is a still camera.

34. The method of claim 29, wherein the image acquisition device is a video camera.

35. The method of claim 29, wherein the image acquisition device is a personal digital assistant (PDA).

36. The method of claim 29, wherein the image acquisition device is a cellular telephone.

37. The method of claim 29, wherein the image acquisition device is handheld.

38. The method of claim 22, wherein the imaging device has an array of pixels corresponding to the image field, and wherein the illumination correction data does not include a separate correction value for each pixel in the array of pixels.

39. The method of claim 38, wherein the illumination correction data comprises data representing slope values indicative of average rates of change in intensity across each of a plurality of blocks in a grid of blocks, each said block including one or more pixels of the array of pixels.

40. The method of claim 22, further comprising:
selecting said illumination correction data to be retrieved from the storage device on the basis of at least a distance of a imaging device from the image field and a zoom setting of the imaging device.

41. An integrated circuit chip containing circuits capable of receiving and processing data obtained from a two-dimensional optical image detector according to a predetermined pattern, for use in an imaging device, the integrated circuit chip comprising:
a first portion of said circuits to capture data from an image field of a uniform surface as illuminated by an illumination source;
a second portion of said circuits to generate, from the captured image data, illumination correction data to compensate for uneven distribution of light attributable to the illumination source as a function of position in the image field, and that stores the illumination correction data in the imaging device;
a third portion of said circuits to select and retrieve only a portion of the stored illumination correction data that maps directly to a portion of the image field subtended by an object of interest in an image plane of the imaging device, of which image data are captured by the first portion of said circuits; and
a fourth portion of said circuits to combine only the retrieved portion of the illumination correction data with the captured image data of the image field to obtain an illumination-corrected object image data set, thereby correcting for variations in the intensity attributable to the illumination source.

42. The integrated circuit chip of claim 41, wherein the imaging device has an array of pixels corresponding to the image field, and wherein the illumination correction data does not include a separate correction value for each pixel in the array of pixels.

43. The integrated circuit chip of claim 42, wherein the illumination correction data comprises data representing slope values indicative of average rates of change in intensity across each of a plurality of blocks in a grid of blocks, each said block including one or more pixels of the array of pixels.

44. The integrated circuit chip of claim 41, wherein said portion of the stored illumination correction data is selected on the basis of at least a distance of the imaging device from the image field and a zoom setting of the imaging device.

45. An imaging device, comprising:
an optical sensor having a two-dimensional array of detectors to output data representative of an intensity of optical radiation thereon;
an optical system fixed with respect to said sensor to direct an optical radiation field onto said sensor from an image field;
an illumination source to illuminate the image field;
one or more processors or one or more dedicated image processing circuits, to generate illumination correction data to compensate for uneven distribution of light attributable to the illumination source across the image field when illuminated by the illumination source; and
a memory to store the illumination correction data;
the one or more processors or one or more dedicated image processing circuits being configured to modify the data outputted from the optical sensor with only a portion of the stored illumination correction data that maps directly to a portion of the image field subtended by an object of interest in the image field, thereby to correct the data outputted from the optical sensor for variations in intensity of the light from the illumination source across the image field.

46. The imaging device of claim 45, wherein the one or more processors or one or more dedicated image processing circuits further generate the illumination correction data as a function of position in the image field.

47. The imaging device of claim 45, wherein the imaging device is a digital camera.

48. The method of claim 45, wherein the imaging device is a still camera.

49. The method of claim 45, wherein the imaging device is a video camera.

50. The method of claim 45, wherein the imaging device is a personal digital assistant (PDA).

51. The method of claim 45, wherein the imaging device is a cellular telephone.

52. The method of claim 45, wherein the imaging device is handheld.

53. The imaging device of claim 45, wherein the imaging device has an array of pixels corresponding to the image field, and wherein the illumination correction data does not include a separate correction value for each pixel in the array of pixels.

54. The imaging device of claim 53, wherein the illumination correction data comprises data representing slope values indicative of average rates of change in intensity across each of a plurality of blocks in a grid of blocks, each said block including one or more pixels of the array of pixels.

55. The imaging device of claim 45, wherein said portion of the stored illumination correction data is selected on the basis of at least a distance of the imaging device from the image field and a zoom setting of the imaging device.

* * * * *